(12) United States Patent
Tsuji

(10) Patent No.: US 6,251,820 B1
(45) Date of Patent: *Jun. 26, 2001

(54) CATALYST FOR PURIFYING EXHAUST GAS AND PROCESS FOR PRODUCING THE SAME

(75) Inventor: Shinji Tsuji, Okazaki (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/791,162

(22) Filed: Jan. 30, 1997

(30) Foreign Application Priority Data

Feb. 2, 1996 (JP) .................................... 8-017748

(51) Int. Cl.$^7$ .............................. B01J 23/00; B01J 21/08; B01J 21/12; B01J 21/14

(52) U.S. Cl. .......................... 502/242; 502/243; 502/250; 502/251; 502/252; 502/258; 502/261; 502/262; 502/303; 502/325; 502/328; 502/330; 502/332; 502/333; 502/334; 502/339; 502/344; 502/347; 502/348; 423/213.5; 423/23.5

(58) Field of Search .................. 423/235, 213.5; 502/303, 304, 242, 243, 250, 251, 252, 258, 261, 262, 325, 328, 330, 332, 333, 334, 339, 344, 347, 348

(56) References Cited

U.S. PATENT DOCUMENTS 5,075,276   12/1991  Ozawa et al. .
5,212,130 * 5/1993  Addiego et al. ............... 502/300

FOREIGN PATENT DOCUMENTS 0 613 714 A2  9/1994  (EP) .
0 657 204 A1  6/1995  (EP) .
0 666 103 A1  8/1995  (EP) .
5-168860      7/1993  (JP) .
5-317652     12/1993  (JP) .
6-31139       2/1994  (JP) .
6-199582 *    7/1994  (JP) .
7-75735       3/1995  (JP) .

OTHER PUBLICATIONS

English Language Translation to Suda '582, Jul. 1994.*
Abstract No. 80: 136990 CA, "Alumina catalysts containing sodium, potassium, and cesium oxides for decomposing nitrogen".
Abstract No. 80: 136990 CA, "Alumina catalysts containing sodium, potassium, and cesium oxides for decomposing nitrogen," no date; Chemical Abstracts vol. 80.

* cited by examiner

Primary Examiner—Wayne Langel
Assistant Examiner—Cam N. Nguyen
(74) Attorney, Agent, or Firm—Oliff & Berridge, PLC

(57) ABSTRACT

A catalyst for purifying an exhaust gas includes amorphous and homogeneous composite oxide particles, a catalytic noble metal element, and metallic oxide particles. The metallic oxide particles interpose among the composite oxide particles to connect them with each other at least. The catalyst has good heat resistance, sulfur-poisoning resistance, and durability. The catalyst is produced as follows. A slurry is prepared by mixing an organosol with a suspension, or by mixing a solution with a suspension. The slurry is deposited on a support substrate to form a coating layer thereon. The suspension includes a precursor powder, and a solvent. The precursor powder includes the composite oxide particles, and the catalytic noble metal element. The composite oxide particles include a support component, and an $NO_x$ storage element. The solvent is free from elution of the $NO_x$ storage element. The organosol includes an organic solvent, and an oxide sol. The solution includes an organic solvent, and an organometallic compound. The oxide sol and organometallic compound includes aluminum, silicon or zirconium.

12 Claims, No Drawings

CATALYST FOR PURIFYING EXHAUST GAS AND PROCESS FOR PRODUCING THE SAME

BACKGROUND OF THE INVENTION

1. Field of the Invention

The present invention relates to a catalyst for purifying an exhaust gas, and to a process for producing the same. More particularly, it relates to a catalyst for purifying an exhaust gas, catalyst which is of good durability, and to a process for producing the same.

2. Description of Related Art

As catalysts for purifying automotive exhaust gases, there have been employed 3-way catalysts so far which oxidize CO and HC, and which reduce $NO_x$, thereby purifying the exhaust gases. For example, the 3-way catalysts have been known widely which comprise a thermal resistant support formed of cordierite, a coating layer formed of γ-alumina and disposed on the support, and a noble metal element selected from the group consisting of platinum (Pt), palladium (Pd) and rhodium (Rh) loaded on the carrier layer.

From the viewpoint of the global environment protection, carbon dioxide ($CO_2$), which is emitted from internal combustion engines of automobiles, or the like, is at issue. In order to reduce the carbon dioxide, so-called lean-burn engines are regarded promising. In lean-burn engines, the air-fuel mixture is lean-burned in an oxygen-rich atmosphere. The fuel consumption can be reduced because lean-burn engines consume the fuel less. Accordingly, the carbon dioxide, which is emitted from lean-burn engines as one of the burned exhaust gases, is inhibited from generating.

The conventional 3-way catalysts oxidize CO and HC, and simultaneously reduce $NO_x$ to purify them. The CO, HC and $NO_x$ are produced by burning an air-fuel mixture whose air-fuel ratio is controlled at the theoretical air-fuel ration (i.e., the stoichiometric point). Consequently, the conventional 3-way catalysts do not have enough activity to remove $NO_x$, which results from the exhaust gases produced by burning the fuel-lean-air-fuel mixture, by reduction in an oxygen-rich atmosphere (or in a fuel-lean atmosphere). Thus, it has been desired to successfully develop an automotive exhaust catalyst and a purifying system which can effectively purify $NO_x$ in an oxygen-rich atmosphere (or in a fuel-lean atmosphere).

Under the circumstances, the applicant of the present invention proposed novel exhaust catalysts, and filed the following patent applications therefor with the Japanese Patent Office. For example, Japanese Unexamined Patent Publication (KODAI) No. 5-317,652 discloses a catalyst for purifying an exhaust gas in which an alkaline-earth metal, and Pt are loaded on a porous support including alumina, or the like; Japanese Unexamined Patent Publication (KOKAI) No. 5-168,860 discloses a catalyst for purifying an exhaust gas in which lanthanum, and Pt are loaded on a porous support; and Japanese Unexamined Patent Publication (KOKAI) No. 6-31,139 discloses a catalyst for purifying an exhaust gas in which an alkali metal, and Pt are loaded on an alumina support. In these catalysts, the $NO_x$ is stored in oxides of the alkaline-earth metal, lanthanum and alkali metal (i.e., $NO_x$ storage elements) in a fuel-lean atmosphere (or in an oxygen-rich atmosphere), and the stored $NO_x$ is released at the stoichiometric point or in a fuel-rich atmosphere (or in an oxygen-lean atmosphere). The released $NO_x$ reacts with the reducing components, such as HC and CO. Thus, the catalysts can exhibit favorable $NO_x$ purifying performance even in a fuel-lean atmosphere (or in an oxygen-rich atmosphere).

When producing these catalysts, a so-called adsorption loading process is employed predominantly: namely; a solution including a compound of a catalytic noble metal is first impregnated into a porous support, such as alumina, and the porous support is dried and calcined to load the catalytic noble metal thereon. Then, a solution including a compound of an $NO_x$ storage element is impregnated into the porous support with the catalytic noble metal loaded thereon, and the porous support is dried and calcined to load the $NO_x$ storage element thereon.

Whilst, the average temperature of exhaust gases at the inlet of catalysts for purifying exhaust gases, and the maximum temperature thereof have tended to increase much higher, because the exhaust-gas emission control has been tightened, and because automobile engines have been required to exhibit high performance. Hence, in catalysts, a further heat-resistance improvement has been longed for. In addition, as the temperature of exhaust gases at the inlet of catalysts increases, a catalyst having an improved $NO_x$ purifying capability at elevated temperatures has been longed for.

However, the conventional catalysts for purifying exhaust gases suffer from a problem in that the $NO_x$ storage capability of the $NO_x$ storage elements degrades because the $NO_x$ storage elements react with the support at elevated temperatures. Moreover, it is difficult for the conventional catalysts to securely exhibit the $NO_x$ purifying capability at elevated temperatures, because they can exhibit the maximum purifying capability only in a narrow temperature range (i.e., temperature window).

In addition, in the conventional catalysts for purifying exhaust gases, the $NO_x$ storage elements are poisoned by $SO_x$ which results from the sulfur included in fuels in a trace amount, and are deteriorated in terms of the $NO_x$ storage capability by the generation of sulfates. As a result, the durability of the conventional catalysts has deteriorated.

In a process for producing the conventional catalysts for purifying exhaust gases, the $NO_x$ storage elements are loaded on the porous support by an adsorption loading process. However, the $NO_x$ storage elements are less likely to be dispersed by the process. Accordingly, the distribution of the $NO_x$ storage elements is heterogeneous, and the crystallization of the $NO_x$ storage elements develops around where the $NO_x$ storage elements are loaded in high concentrations. As a result, the $NO_x$ storage capability of the $NO_x$ storage elements has deteriorated. In particular, the $NO_x$ purifying capability of the resulting catalysts at elevated temperatures depend greatly on the combinations of the $NO_x$ storage elements and the porous support, and on the dispersibility of the $NO_x$ storage elements.

For instance, when the $NO_x$ storage elements are dispersed less, the crystals of the sulfates, which result from the sulfur poisoning, are likely to grow. It is furthermore difficult to eliminate the crystalline sulfates from the resulting catalysts for purifying exhaust gases. As a result, the durability of the resulting catalysts has deteriorated. Moreover, the alkali metals, one of the $NO_x$ storage elements, are likely to be dissipated or eluted out by water vapor involved in the exhaust gases, because they are loaded on the surface of the porous support by the conventional adsorption loading process. As a result, the durability of the conventional catalysts with the alkali metals loaded thereon has not been high satisfactorily.

Therefore, the inventor of the present invention developed an amorphous and homogeneous composite oxide support in which $NO_x$ storage elements are dispersed on the order of atomic size. The composite oxide support comprises a support component, and an $NO_x$ storage element. The support component includes an oxide of metal which is at least one element selected from the group consisting of group 3B elements, group 4A elements and group 4B elements in the periodic table of the elements. The $NO_x$ storage element includes at least one element selected from the group consisting of alkali metals, alkaline-earth metals and rare-earth elements. The support component and the $NO_x$ storage element constitute and amorphous composite oxide.

It is possible to produce a catalyst for purifying an exhaust gas, which exhibits good $NO_x$ purifying performance, and which is inhibited from being poisoned by sulfur, by using the composite oxide support. For example, the composite oxide support can be pulverized to prepare a powder. The resulting composite-oxide-support powder, and another powder with a noble metal element loaded thereon can be mixed to complete such a catalyst.

In the conventional catalysts for purifying exhaust gases, a honeycomb-shaped support substrate has been used widely. The honeycomb-shaped support substrate is made from cordierite or metal, and is covered with a coating layer formed on the surface. The coating layer is formed of a support powder, such as alumina, and a catalytic component is loaded thereon. When producing the conventional catalysts, the support substrate is immersed into a slurry in which the support powder is dispersed in water, and is taken out of the slurry. Then, the excessive slurry is removed from the support substrate. Finally, the support substrate is dried, and calcined to complete the conventional catalysts.

However, the inventor of the present invention found out the following drawbacks: namely; when the slurry was prepared by dispersing the above-described composite oxide support powder to form the coating layer on the support substrate, the $NO_x$ elements, which have been dispersed homogeneously in the composite oxide support, eluted out into the slurry to degrade the dispersibility of the $NO_x$ elements in the composite oxide support. Accordingly, the resulting catalysts for purifying exhaust gases were deteriorated in terms of heat resistance and sulfur-poisoning resistance.

The drawback results from the fact that the $NO_x$ storage elements are likely to dissolve into water. Accordingly, when an organic solvent is employed to keep the $NO_x$ storage elements from eluting out, it is possible to overcome the drawback. However, the inventor of the present invention found out another drawback when a slurry was prepared by using an organic solvent. The density of the coating layer made from such a slurry has decreased to deteriorate the strength thereof, because the surface tension of organic solvent is as low as $1/3$ of the surface tension of water.

SUMMARY OF THE INVENTION

The present invention has been developed under the aforementioned circumstances. It is therefore an object of the present invention to provide a catalyst for purifying an exhaust gas, which is of improved durability, by keeping the dispersibility of $NO_x$ storage elements high in the coating layer, and by simultaneously upgrading the strength of the coating layer.

A first aspect of the present invention is a catalyst for purifying an exhaust gas which can carry out the object. The present catalyst comprises:

amorphous and homogeneous composite oxide particles including a support component, and an $NO_x$ storage element, the support component including an oxide of metal being at least one element selected from the group consisting of group 3B elements, group 4A elements and group 4B elements in the periodic table of the elements, the $NO_x$ storage element including at least one element selected from the group consisting of alkali metals, alkaline-earth metals and rare-earth elements;

a catalytic noble metal element being in at least one state selected from the group consisting of being involved homogeneously in the composite oxide particles and being loaded on the composite oxide particles; and metallic oxide particles including at least one oxide selected from the group consisting of oxides of aluminum (Al), oxides of silicon (Si) and oxides of zirconium (Zr), and interposing among the composite oxide particles to connect the composite oxide particles with each other at least.

A second aspect of the present invention is a process for producing the above-described present catalyst. The production process comprises the steps of:

preparing a suspension by dispersing a precursor powder in a solvent, the precursor powder including amorphous and homogeneous composite oxide particles, and a catalytic noble metal element, the composite oxide particles including a support component, and an $NO_x$ storage element, the support component including an oxide of metal being at least one element selected from the group consisting of group 3B elements, group 4A elements and group 4B elements in the periodic table of the elements, the $NO_x$ storage element including at least one element selected from the group consisting of alkali metals, alkaline-earth metals and rare-earth elements, the catalytic noble metal element being in at least one state selected from the group consisting of being involved homogeneously in the composite oxide particles and being loaded on the composite oxide particles, the solvent being free from elution of the $NO_x$ storage element;

preparing a slurry by mixing an organosol with the suspension, the organosol including an organic solvent, and an oxide sol including at least one oxide selected from the group consisting of oxides of aluminum (Al), oxides of silicon (Si) and oxides of zirconium (Zr), and dispersed in the organic solvent; and depositing the slurry on a support substrate, and drying and thermally treating the support substrate, thereby forming a coating layer on the support substrate.

A third aspect of the present invention is another process for producing the above-described present catalyst. The another production process comprises the steps of:

preparing a suspension by dispersing a precursor powder into a solvent, the precursor powder including amorphous and homogeneous composite oxide particles, and a catalytic noble metal element, the composite oxide particles including a support component, and an $NO_x$ storage element, the support component including an oxide of metal being at least one element selected from the group consisting of group 3B elements, group 4A elements and group 4B elements in the periodic table of the elements, the $NO_x$ storage element including at least one element selected from the group consisting of alkali metals, alkaline-earth metals and rare-earth elements, the catalytic noble metal element being in at least one state selected from the group consisting of being involved homogeneously in the composite oxide particles and being loaded on the composite oxide particles, the solvent being free from elution of the $NO_x$ storage element;

preparing a slurry by mixing a solution with the suspension, the solution including an organic solvent, and an organometallic compound including at least one element selected from the group consisting of aluminum (Al), silicon (Si) and zirconium (Zr), and dissolved into the solvent; and depositing the slurry on a support substrate, and drying and thermally treating the support substrate, thereby forming a coating layer on the support substrate.

The present catalyst for purifying an exhaust gas according to the first aspect of the present invention is good in terms of heat resistance and sulfur-poisoning resistance, and is also good in terms of coating-layer strength. Therefore, the present catalyst is superb in terms of durability. In addition, the present processes for producing a catalyst for purifying an exhaust gas according to the second and third aspects of the present invention are free from the problems which result from the elution of the $NO_x$ storage element. Hence, the present production processes can reliably produce a catalyst for purifying an exhaust gas whose coating layer includes the $NO_x$ storage element homogeneously and with high dispersibility, and whose coating layer is good in terms of strength as well.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

In the present invention, the support component includes an oxide of metal which is at least one element selected from the group consisting of group 3B elements, group 4A elements and group 4B elements in the periodic table of the elements. For example, the oxide can be at least one oxide selected from the group consisting of alumina, titania, zirconia, silica, silica-alumina and silica-titania. Among the group 3B elements, group 4A elements and group 4B elements, it is preferred that the group 4A elements are included in the support component, because the group 4A elements operate as a co-catalyst to inhibit the $NO_x$ storage element from being poisoned by sulfur.

In the present invention, the $NO_x$ storage element includes at least one element selected from the group consisting of alkali metals, alkaline-earth metals and rare-earth elements. The alkali metals are the group 1A elements in the periodic table of element, and can be exemplified by lithium, sodium, potassium, rubidium, cesium and francium. The alkaline-earth metals are the group 2A elements in the periodic table of the elements, and can be exemplified by barium, beryllium, magnesium, calcium and strontium. The rare-earth elements herein mean not only the chemical elements with atomic numbers 58 to 71, which can be exemplified by cerium, praseodymium and neodymium, etc., but also scandium, yttrium and lanthanum.

In the present invention, the support component and the $NO_x$ storage element constitute the amorphous and homogeneous composite oxide particles. In order to form the composite oxide particles, there is a process available: namely; a first solution can be prepared with a sol which includes an oxide constituting the support component; the first solution can be mixed with a second solution of a compound which includes the $NO_x$ storage element; the mixed solution can be turned into a gel; and the resulting gel can be thermally treated. In accordance with the process, the oxide sol includes fine particles to have a BET specific surface area of approximately 500 m²/g or more, further preferably from 500 to 1,000 m²/g, and the $NO_x$ storage elements are dispersed on the surface of the fine particles. Hence, the $NO_x$ storage elements can be dispersed extremely highly by employing the process. Moreover, the temperature at which the $NO_x$ storage element crystallizes can be increased by the process. Thus, the present catalyst for purifying an exhaust gas can fully keep the superb durability at elevated temperatures.

Note that the amorphous and homogeneous composite oxide particles, on which the NOx storage elements are highly dispersed, can be produced by a sol-gel process by supplying both of the support component and the $NO_x$ storage element as their metallic alkoxides. However, the metallic alkoxides are expensive so that the cost of the raw material adds up considerably in the sol-gel process. On the contrary, the composite oxide can be produced less expensively by the above-described process, which employs the sol including the oxide, than by the sol-gel process.

The composition ratio of the support component with respect to the $NO_x$ storage element can preferably fall in a range of 1/3>(support component/$NO_x$ storage element)>1/90 by molar ratio. Note that the number of mols of the support component and the $NO_x$ storage element are herein expressed by the number of mols of their oxides. When the amorphous and homogeneous composite oxide includes the $NO_x$ storage element too much (e.g., when the molar ratio is 1/90 or less), the resulting composite oxide somewhat exhibits an $NO_x$ storage capability, but releases $NO_x$ insufficiently in a reducing atmosphere. Moreover, the resulting composite oxide has a small specific surface area, and is in short of heat resistance. When the amorphous and homogeneous composite oxide includes the $NO_x$ storage element too less (e.g., when the molar ratio is 1/3 is more), the resulting composite oxide is subjected to sintering at elevated temperatures to decrease the specific surface area, and can hardly store $NO_x$ in a required amount. Thus, when the molar ratio falls in the aforementioned preferred range, further preferably, in a range of 1/5>(support component/$NO_x$ storage element)>1/20 can be supplied by molar ratio, the composite oxide of sufficient heat resistance and durability can be prepared.

It is especially preferred to employ alumina as the support component, and to employ cesium (Cs) as the $NO_x$ storage element. Cs is good in terms of $NO_2$ storage capability at low temperatures. In addition, due to the interaction with Al, Cs exhibits a good $NO_x$ storage capability at elevated temperatures at 400° C. or more. Specifically, Cs is basic so strongly that it firmly combines with acidic $NO_x$. Thus, Cs is good in terms of $NO_x$ storage capability. Further, compared with the other $NO_x$ storage elements, such as barium Ba, or the like, Cs is less likely to react with alumina, and can keep the $NO_x$ storage capability high for long period of time. Furthermore, when Cs is combined with alumina to form a composite oxide, the resulting composite oxide exhibits high durability. Moreover, even when Cs is poisoned by sulfur, the resulting sulfates are composite sulfates formed at Cs and Al which are more likely to be decomposed than the sulfates formed of Ba, or the like. In addition, $SO_2$ is eliminated from the decomposed sulfates, and the remaining composite oxide again operates as an $NO_x$ storage member.

In the present invention, the metallic oxide particles include at least one oxide selected from the group consisting of oxides of aluminum (Al), oxides of silicon (Si) and oxides of zirconium (Zr), and interpose among the amorphous and homogeneous composite oxide particles to connect the composite oxide particles with each other at least. When a catalyst for purifying an exhaust gas includes a coating layer, which is formed on a support substrate made from cordierite or metal, and on which a catalytic noble metal element is loaded, the composite oxide particles are connected with each other by the metallic oxide particles in the coating layer. Moreover, an extra advantage is effected by the metallic oxide particles; namely: the support substrate and the coating layer are connected with each other by the metallic oxide particles. Thus, the coating layer is enhanced in terms of strength, and exhibits good durability.

The metallic oxide particles can preferably be included in an amount of from 0.1 to 20% by weight, further preferably from 1 to 10% by weight, in the present catalyst for purifying an exhaust gas. When the content of the metallic oxide particles is less than 0.1% by weight, there little arises the aforementioned strength enhancement. Consequently, the resulting catalyst is deteriorated in terms of durability. When the content of the metallic oxide particles is more than 20% by weight, the resulting catalyst exhibits decreased $NO_x$ purifying performance.

In the present invention, the catalytic noble metal element is in at least one state selected from the group consisting of being involved homogeneously in the amorphous and homogeneous composite oxide particles and being loaded on the composite oxide particles. The catalytic noble metal element can be exemplified by platinum (Pt), rhodium (Rh), palladium (Pd), silver (Ag), gold (Au) and iridium (Ir). The loading amount or content of the catalytic noble metal element can be set optionally in a range of from 0.1 to 10% by weight, preferably from 1 to 5% by weight, in the present catalyst for purifying an exhaust gas. When the loading amount or content of the catalytic noble metal element is less than 0.1%, the resulting catalyst is deteriorated in terms of $NO_x$ purifying performance and 3-way activity. Thus, such a small loading amount or content is not practical. When the loading amount or content of the catalytic noble metal element is more than 10%, the resulting catalyst exhibits saturated $NO_x$ purifying performance only, and such an enlarged loading amount or content results in pushing up the production cost. Note that the catalytic noble metal element can be loaded on the surface of the composite oxide particles, or it can be homogeneously dispersed in the composite oxide particles, or it can constitute the composite oxide particles together with the support component and the $NO_x$ storage element.

In the production processes according to the second and third aspects of the present invention, the catalytic noble metal element can be included by adding the catalytic noble metal element to the composite oxide particles when preparing the composite oxide particles, or can be loaded on the composite oxide particles after forming the composite oxide particles from the support component and the $NO_x$ storage element. In the latter case, the absorption loading process can be employed. Note that, however, the following precautions can preferably be employed in order that the composite oxide particles are free from the contact with water: namely, a powder, which includes a support component with the catalytic noble metal element loaded independently, can be mixed with the composite oxide particles; or a solution, in which a compound of the catalytic noble metal element is dissolved into an organic solvent, can be employed instead of an aqueous solution.

In the production processes according to the second and third aspects of the present invention, the precursor powder, which includes the composite oxide particles and the catalytic noble metal element, is first mixed with the solvent, which is free from the elution of the $NO_x$ storage element, thereby preparing the suspension. In general, the term, "the solvent, which is free from the elution of the $NO_x$ storage element", means organic solvents. In certain applications, however, the solvent, which is free from the elution of the $NO_x$ storage element, can be organic solvents which involve water. There are a variety of organic solvents. It is preferred to employ an organic solvent of low viscosity, because the resulting slurry exhibits a high viscosity when the organic solvent exhibits a high viscosity. In addition, it is preferred to employ an organic solvent of good wettability to a support substrate. Hence, it is recommended to employ alcohols. Among alcohols, it is especially preferred to employ isopropyl alcohol (i.e., 2-propanol) from which the $NO_x$ storage element is considerably less likely to elute.

Then, the resulting suspension is mixed with a dispersion or solution, in which the metallic organosol or the organometallic compound is dispersed or dissolved, to form the slurry. The metallic organosol, or the organometallic compound includes at least one element which is selected from the group consisting of Al, Si and Zr. The slurry forms the coating layer on the support substrate. In the resulting coating layer, the metallic oxide works as a binder not only to connect the composite oxide particles with each other, but also to connect the coating layer with the support substrate. Thus, the coating layer is enhanced in terms of strength. Note that, metallic oxides, which include elements other than those described above, might upgrade the strength of the resulting coating layer, but adversely affect the purifying performance of the resulting catalyst for purifying an exhaust gas.

As for the concentration of the precursor powder, which includes the composite oxide particles and the catalytic noble metal, in the slurry, it is preferred that the concentration falls in a range of from 30 to 70% by weight, further preferably from 40 to 60% by weight. When the concentration is less than 30% by weight, the man-hour requirement for forming the coating layer to a predetermined thickness enlarges because the coating-layer-forming step should be carried out repeatedly. When the concentration is more than 70% by weight, the strength of the resulting coating layer is degraded because the viscosity of the resulting slurry is increased and the density of the resulting coating layer is decreased.

As for the addition amount of the organosol or the organometallic compound, it is preferred that the addition amount falls in a range of from 0.1 to 20% by weight, further preferably from 0.5 to 10% by weight, which is expressed by a value converted into an amount of constituent oxide, in the coating layer, because of the aforementioned reason. When the addition amount is more than 20% by weight, there arises a drawback in that the density of the coating layer is decreased to deteriorate the strength thereof, because the resulting slurry exhibits a high viscosity.

As for the organosol, an organoalumina sol, an organosilica sol, and an organozirconia sol can be employed. The average particle diameter of these oxide sols can preferably be 100 nm or less. When the average particle diameter is more than 100 nm, the resulting coating layer is degraded in terms of strength. As for the organometallic compound, aluminum alkoxides, alkoxy silanes, zirconium alkoxides, acetylacetonato complexes including the aforementioned metallic elements (e.g. Al, Si and Zr), and chelate compounds including the aforementioned metallic elements.

The present invention will be hereinafter described in detail with reference to preferred embodiments and comparative examples.

First Preferred Embodiment (1) Preparation of Composite Oxide Powder 16.0 grams of cesium acetate, and 153.3 grams of aluminum triisopropoxide were dissolved into 480 milliliters of isopropyl alcohol. The resulting solution was refluxed at 80° C. for 2 hours. The refluxed solution was thereafter mixed with 14.5 grams of 2, 4-pentanedione, and was further stirred for 3 hours. Then, a mixed solution was dropped into the solution while keeping the temperature of the refluxed solution at 80° C. The mixed solution included 84.0 milliliters of ion-exchanged water, and 100 milliliters of isopropyl alcohol. The refluxed solution with the mixed solution dropped was stirred at 80° C. for 5 hours, and was thereafter dried by heating at 120° C. under decompression. A white powder was thus prepared.

The resulting powder was calcined at 900° C. in air for 5 hours, thereby preparing a composite oxide powder. The resulting composite oxide powder exhibited a BET specific surface area of 161 m$^2$/g. According to the results of an X-ray diffraction analysis to which the composite oxide was subjected. Cs and Al was found to constitute composite oxide particles, and Cs was found to be dispersed highly in Al. Note that the composite oxide powder included Cs and Al in a molar ratio of 1:9 as their oxides (i.e., $Cs_2O/Al_2O_3$ = 1/9).

(2) Preparation of Suspension

The thus prepared composite oxide powder was weighted out by a predetermined amount, and was mixed with isopropyl alcohol. Another solution was added to the resulting solution, and was stirred to mix for 1 hour. The another solution was prepared by dissolving a predetermined amount of bis-acetylacetonato platinum ($Pt(C_5H_7O_2)_2$), working as a platinum source, into isopropyl alcohol. Thereafter, the solvent (i.e., isopropyl alcohol) was separated from the mixed solution by centrifugal separation. The resulting precipitate was heated gradually from room temperature to 120° C. to dry. Then, the dried precipitate was heated to 500° C. in a nitrogen at atmosphere, thereby carrying out a heat treatment. A precursor powder was thus prepared. Note that the loading amount of Pt was 1.5% by weight in the resulting precursor powder. A predetermined amount of the thus prepared precursor powder was mixed with isopropyl alcohol to prepare a suspension.

(3) Preparation of Slurry

An organosilica sol was prepared, and was mixed with the resulting suspension in a predetermined ration. The organosilica sol included a silica sol having an average particle diameter of 10 nm in an amount of 30% by weight, and the balance of isopropyl alcohol. Note that, in the slurry, silica was added to the composite oxide powder in an amount of 0.5% by weight.

(4) Preparation of Coating Layer

A honeycomb-shaped monolithic catalyst support was prepared, and was made from cordierite. The monolithic catalyst support was immersed into the resulting slurry, and was taken out therefrom. After suction-removing the excessive slurry by a blower, the monolithic catalyst support was heated gradually from room temperature to 120° C. These operations were carried out repeatedly until the slurry is coated on the monolithic catalyst support in a predetermined amount. Thereafter, the monolithic catalyst support with the slurry coated thereon was thermally treated at 500° C. under a nitrogen atmosphere for 1 hour, thereby forming a coating layer on the monolithic catalyst support. A catalyst of the First Preferred Embodiment for purifying an exhaust gas was then produced. Note that the coating layer was formed in an amount of 150 grams with respect to 1 L of the monolithic catalyst support.

(5 Examination and Evaluation

The thus produced catalyst was immersed into isopropyl alcohol. The resulting mixture was radiated by a 40 kHz ultrasonic wave for 1 hour, and was examined for the weight variation of the catalyst before and after the ultrasonic-wave radiation. The coming-off rate of the coating layer was thus determined. The results of the examination were set forth in Table 2 below.

Further, the resulting catalyst was installed to a durability testing apparatus which utilizes a model gas, and was subjected to a durability test. In the durability test, a fuel-lean model gas and fuel-rich model gas whose compositions are recited in Table 1 below were flowed through the testing apparatus alternately for 5 hours. Note that the fuel-lean model gas was flowed for 4 minutes, and alternately the fuel-rich model gas was flowed for 1 minute, and that the temperature of the model gases was 900° C. at the inlet of the testing apparatus, and that the space velocity (i.e., SV) of the model gases was 50,000 hr$^{-1}$. Thereafter, the fuel-lean model gas and a fuel-rich model gas were further flowed through the testing apparatus alternately for 2 minutes, respectively, at the space velocity of 100,000 hr$^{-1}$. The catalyst was thus examined for the $NO_x$ conversion in a fuel-lean atmosphere. The thus measured $NO_x$ conversion was taken as the "$NO_x$ conversion after heat treatment" set forth in Table 2 below.

Furthermore, the resulting catalyst was installed to another durability testing apparatus which utilizes a model gas, and was subjected to a sulfur poisoning. In the sulfur poisoning, a sulfur-poisoning gas whose composition is recited in Table 1 below and which included $SO_2$ in an amount of 200 ppm was flowed through the another testing apparatus for 30 minutes. Note that the temperature of the sulfur-poisoning gas was 400° C. at the inlet of the another testing apparatus, and the space velocity thereof was 100,000 hr$^{-1}$. Thereafter, in the same manner as described above, the catalyst was examined for the $NO_x$ conversion in a fuel-lean atmosphere. The thus measured $NO_x$ conversion was taken as the "$NO_x$ conversion after sulfur poisoning" set forth in Table 2 below.

Moreover, the catalyst subjected to the sulfur poisoning was chemically analyzed for the sulfur deposition therein. The results of these examinations are summarized in Table 2 below.

TABLE 1

|  | CO (%) | $C_3H_6$ (ppmC) | $CO_2$ (%) | $H_2O$ (%) | NO (ppm) | $SO_2$ (ppm) | $N_2$ |
|---|---|---|---|---|---|---|---|
| Fuel-lean Model Gas | 0.1 | 2000 | 10.0 | 10.0 | 500 | 0 | Balance |
| Fuel-rich Model Gas | 0.5 | 2000 | 10.0 | 10.0 | 200 | 0 | Balance |
| Sulfur-Poisoning Gas | 0.1 | 2000 | 10.0 | 10.0 | 500 | 200 | Balance |

Second Preferred Embodiment

In a Second Preferred Embodiment, a combination of barium diisopropoxide and aluminum triisopropoxide was employed in the preparation of composite oxide powder. Note that the resulting composite oxide powder included Ba and Al in a molar ratio of 1:3 as their oxides (i.e., $BaO/Al_2O_3=1/3$). Unless otherwise specified, a catalyst of the Second Preferred Embodiment for purifying an exhaust gas was produced and examined for the characteristics in the same manner as the First Preferred Embodiment. Table 2 below summarizes the arrangement of the resulting catalyst, and the characteristics thereof.

Third Preferred Embodiment

In a Third Preferred Embodiment, a combination of cesium acetate, barium diisopropoxide and aluminum triisopropoxide was employed in the preparation of composite oxide powder. Note that the resulting composite oxide powder included Cs, Ba and Al in a molar ratio of 1:1:6 as their oxides (i.e., $Cs_2O/BaO/Al_2O_3=1/1/6$). Unless otherwise specified, a catalyst of the Third Preferred Embodiment for purifying an exhaust gas was produced and examined for the characteristics in the same manner as the First Preferred Embodiment. Table 2 below summarizes the arrangement of the resulting catalyst, and the characteristics thereof.

Fourth Preferred Embodiment

In a Fourth Preferred Embodiment, a combination of potassium acetate, titanium tetraisopropoxide and aluminum triisopropoxide was employed in the preparation of composite oxide powder. Note that the resulting composite oxide powder included K, Ti and Al in a molar ratio of 1:1:6 as their oxides (i.e., $K_2O/TiO_2/Al_2O_3=1/1/6$). Unless otherwise specified, a catalyst of the Fourth Preferred Embodiment for purifying an exhaust gas was produced and examined for the characteristics in the same manner as the First Preferred Embodiment. Table 2 below summarizes the arrangement of the resulting catalyst, and the characteristics thereof.

Fifth Preferred Embodiment

In a Fifth Preferred Embodiment, a combination of potassium acetate, cerium acetate and aluminum triisopropoxide was employed in the preparation of composite oxide powder. Note that the resulting composite oxide powder included K, Ce and Al in a molar ratio of 2:1:12 as their oxides (i.e., $K_2O/CeO_2/Al_2O_3=2/1/12$). Unless otherwise specified, a catalyst of the Fifth Preferred Embodiment for purifying an exhaust catalyst was produced and examined for the characteristics in the same manner as the First Preferred Embodiment. Table 2 below summarizes the arrangement of the resulting catalyst, and the characteristics thereof.

Sixth Preferred Embodiment

In a Sixth Preferred Embodiment, a combination of bisacetylacetonato platinum, cesium acetate and aluminum triisopropoxide was employed in the preparation of composite oxide powder. Note that the resulting precursor powder included Pt, Cs and Al in a molar ratio of 0.1:1:9 as their oxides (i.e., $PtO/CsO_2/Al_2O_3=0.1/1/9$), and that the loading amount of Pt was 1.5% by weight in the resulting precursor powder. Moreover, the resulting precursor powder was dispersed in isopropyl alcohol to prepare a suspension in the preparation of suspension. Unless otherwise specified, a catalyst of the Sixth Preferred Embodiment for purifying an exhaust gas was produced and examined for the characteristics in the same manner as the First Preferred Embodiment. Table 2 below summarizes the arrangement of the resulting catalyst, and the characteristics thereof.

Seventh Preferred Embodiment

In a Seventh Preferred Embodiment, a combination of bisacetylacetonato platinum, potassium acetate, titanium tetraisopropoxide and aluminum triisopropoxide was employed in the preparation of composite oxide powder. Note that the resulting precursor powder included Pt, K, Ti and Al in a molar ratio of 0.1:1:1:6 as their oxides (i.e., $PtO/K_2O/TiO_2/Al_2O_3=0.1/1/1/6$), and that the loading amount of Pt was 1.5% by weight in the resulting precursor powder, Moreover, the resulting precursor powder was dispersed in isopropyl alcohol to prepare a suspension in the preparation of suspension. Unless otherwise specified, a catalyst of the Seventh Preferred Embodiment for purifying an exhaust gas was produced and examined for the characteristics in the same manner as the First Preferred Embodiment. Table 2 below summarizes the arrangement of the resulting catalyst, and the characteristics thereof.

Eighth Preferred Embodiment

In an Eighth Preferred Embodiment, a combination of bisacetylacetonato platinum, barium isopropoxide, titanium tetraisopropoxide and aluminum triisopropoxide was employed in the preparation of composite oxide powder. Note that the resulting precursor powder included Pt, Ba, Ti and Al in a molar ratio of 0.1:2:1:6 as their oxides (i.e., $PtO/BaO/TiO_2/Al_2O_3=0.1/2/1/6$), and that the loading amount of Pt was 1.5% by weight in the resulting precursor powder. Moreover, the resulting precursor powder was dispersed in isopropyl alcohol to prepare a suspension in the preparation of suspension. Unless otherwise specified, a catalyst of the Eighth Preferred Embodiment for purifying an exhaust gas was produced and examined for the characteristics in the same manner as the First Preferred Embodiment. Table 2 below summarizes the arrangement of the resulting catalyst, and the characteristics thereof.

Ninth through Sixteenth Preferred Embodiments

In Ninth through Sixteenth Preferred Embodiments, an organoalumina sol was employed as a metallic oxide source instead of the organosilica sol in the preparation of slurry. The organoalumina sol included an alumina sol having an average particle diameter of 50 nm in an amount of 20% by weight, and the balance of isopropyl alcohol. Unless otherwise specified, catalysts of the Ninth through Sixteenth Preferred Embodiments for purifying an exhaust gas were produced in the same manner as the First through Eighth Preferred Embodiment, respectively. The resulting catalysts were examined for the characteristics in the same manner as the First Preferred Embodiment. Table 3 below summarizes the arrangements of the resulting catalysts, and the characteristics thereof.

Seventeenth through Twenty-fourth Preferred Embodiment

In Seventeenth through Twenty-fourth Preferred Embodiments, an organozirconia sol was employed as a metallic oxide source instead of the organosilica sol in the preparation of slurry. The organozirconia sol included a zirconia sol having an average particle diameter of 30 nm in an amount of 30% by weight, and the balance of isopropyl alcohol. Unless otherwise specified, catalysts of the Seventeenth through Twenty-fourth Preferred Embodiments for purifying an exhaust gas were produced in the same manner as the First through Eighth Preferred Embodiment, respectively. The resulting catalysts were examined for the characteristics in the same manner as the First Preferred Embodiment. Table 4 below summarizes the arrangements of the resulting catalysts, and the characteristics thereof.

Twenty-fifth Preferred Embodiment

In a Twenty-fifth Preferred Embodiment, a combination of potassium acetate, titanium tetraisopropoxide and aluminum triisopropoxide was employed to prepare a composite oxide powder in the preparation of composite oxide powder. Note that the resulting composite oxide powder included K, Ti and Al in a molar ratio of 1:1:6 as their oxides (i.e., $K_2O/TiO_2/Al_2O_3=1/1/6$). Moreover, in the Twenty-fifth Preferred Embodiment, an aluminum triisopropoxide solution was employed as a metallic oxide source instead of the organosilica sol in the preparation of slurry. The solution included aluminum triisopropoxide in an amount of 60% by weight in 2-methoxyethanol. Unless otherwise specified, a catalyst of the Twenty-fifth Preferred Embodiment for purifying an exhaust gas was produced and examined for the characteristics in the same manner as the First Preferred Embodiment. Table 4 below summarizes the arrangement of the resulting catalyst, and the characteristics thereof.

Twenty-sixth Preferred Embodiment

In a Twenty-sixth Preferred Embodiment, a combination of bisacetylacetonato platinum, potassium acetate, titanium tetraisopropoxide and aluminum triisopropoxide was employed to prepare a precursor powder in the preparation of composite oxide powder. Note that the resulting precursor powder included Pt, K, Ti and Al in a molar ratio of 0.1:1:1:6 as their oxides (i.e., $PtO/K_2O/TiO_2/Al_2O_3=0.1/1/1/6$), and that the loading amount of Pt was 1.5% by weight in the resulting precursor powder. Moreover, in the Twenty-sixth Preferred Embodiment, the resulting precursor powder was dispersed in isopropyl alcohol to prepare a suspension in the preparation of suspension, and tetraethoxy silane was employed as a metallic oxide source instead of the organosilica sol in the preparation of slurry. Note that the concentration of tetraethoxy silane was 100% by weight in the metallic oxide source. Unless otherwise specified, a catalyst of the Twenty-sixth Preferred Embodiment for purifying an exhaust gas was produced and examined for the characteristics in the same manner as the First Preferred Embodiment. Table 4 below summarizes the arrangement of the resulting catalyst, and the characteristics thereof.

Twenty-seventh through Thirty-fourth Preferred Embodiments

In Twenty-seventh through Thirty-fourth Preferred Embodiments, a zirconium tetraisopropoxide solution was employed as a metallic oxide source instead of the organosilica sol in the preparation of slurry. Note that the concentration of zirconium tetraisopropoxide was 70% by weight in the zirconium tetraisopropoxide solution. Unless otherwise specified, catalysts of the Twenty-seventh through Thirty-fourth Preferred Embodiments for purifying an exhaust gas were produced in the same manner as the First through Eighth Preferred Embodiment, respectively. The resulting catalysts were examined for the characteristics in the same manner as the First Preferred Embodiment. Table 5 below summarizes the arrangements of the resulting catalysts, and the characteristics thereof.

Thirty-fifth through Forty-second Preferred Embodiments

In Thirty-fifth through Forty-second Preferred Embodiments, an aluminum nitrate solution was employed as a metallic oxide source instead of the organosilica sol in the preparation of slurry. Note that the employed aluminum nitrate included water of crystallization in a quantity of 9 by mol, and that the concentration of aluminum nitrate was 30% by weight in the aluminum nitrate solution. Unless otherwise specified, catalysts of the Thirty-fifth through Forty-second Preferred Embodiments for purifying an exhaust gas were produced in the same manner as the First through Eighth Preferred Embodiment, respectively. The resulting catalysts were examined for the characteristics in the same manner as the First Preferred Embodiment. Table 6 below summarizes the arrangements of the resulting catalysts, and the characteristics thereof.

Forty-third through Fiftieth Preferred Embodiments

In Forty-third through Fiftieth Preferred Embodiments, an alumina sol dispersion was employed as a metallic oxide source instead of the organosilica sol in the preparation of slurry. Note that the employed alumina sol included alumina (an average particle diameter of 50 nm) in an amount of 20% by weight, and the balance of water, and that the concentration of alumina sol was 15% by weight in the alumina sol dispersion, and the balance of isopropyl alcohol. Unless otherwise specified, catalysts of the Forty-third through Fiftieth Preferred Embodiments for purifying an exhaust gas were produced in the same manner as the First through Eighth Preferred Embodiment, respectively. The resulting catalysts were examined for the characteristics in the same manner as the First Preferred Embodiment. Table 7 below summarizes the arrangements of the resulting catalysts, and the characteristics thereof.

Fifty-first through Fifty-eighth Preferred Embodiments

In Fifty-first through Fifty-eighth Preferred Embodiments, a zirconia sol dispersion was employed as a metallic oxide source instead of the organosilica sol in the preparation of slurry. Note that the employed zirconia sol included zirconia (an average particle diameter of 30 nm) in an amount of 30% by weight, and the balance of water, and that the concentration of zirconia sol was 10% by weight in the zirconia sol dispersion, and the balance of isopropyl alcohol. Unless otherwise specified, catalysts of the Fifty-first through Fifty-eighth Preferred Embodiments for purifying an exhaust gas were produced in the same manner as the First through Eighth Preferred Embodiment, respectively. The resulting catalysts were examined for the characteristics in the same manner as the First Preferred Embodiment. Table 8 below summarizes the arrangements of the resulting catalysts, and the characteristics thereof.

Comparative Example No. 1

In Comparative Example No. 1, the precursor powder of the First Preferred Embodiment was dispersed in water to prepare a suspension in the preparation of suspension, and an alumina sol having an average particle diameter of 50 nm was employed as a metallic oxide source instead of the organosilica sol in the preparation of slurry. Note that the employed alumina sol included alumina in an amount of 20% by weight, and the balance of water. Unless otherwise specified, a catalyst of Comparative Example No. 1 for purifying an exhaust gas was produced and examined for the characteristics in the same manner as the First Preferred Embodiment. Tables 2 through 8 below summarize the arrangement of the resulting catalyst, and the characteristics thereof.

Comparative Example No. 2

In Comparative Example No. 2, a combination of potassium acetate, titanium tetraisopropoxide and aluminum triisopropoxide was employed to prepare a composite oxide powder in the preparation of composite oxide powder. Note that the resulting composite oxide powder included K, Ti and Al in a molar ratio of 1:1:6 as their oxides (i.e., $K_2O/TiO_2/Al_2O_3=1/1/6$). Moreover, in Comparative Example No. 2, a precursor powder was prepared in the same manner as the First Preferred Embodiment, but was dispersed in water to prepare a suspension in the preparation of suspension. In addition, in Comparative Example No. 2, an alumina sol having an average particle diameter of 50 nm was employed as a metallic oxide source instead of the organosilica sol in the preparation of slurry. Note that the alumina sol included alumina in an amount of 20% by weight, and the balance of water. Unless otherwise specified, a catalyst of Comparative Example No. 2 for purifying an exhaust gas was produced and examined for the characteristics in the same manner as the First Preferred Embodiment. Tables 2 through 8 below summarize the arrangement of the resulting catalyst, and the characteristics thereof.

Comparative Example No. 3

In Comparative Example No. 3, a combination of bisacetylacetonato platinum, potassium acetate, titanium tetraisopropoxide and aluminum triisopropoxide was employed to prepare a precursor powder in the preparation of composite oxide powder. Note that the resulting precursor powder included Pt, K, Ti and Al in a molar ratio of 0.1:1:1:6 as their oxides (i.e., $PtO/K_2O/TiO_2/Al_2O_3=0.1/1/1/6$), and that the loading amount of Pt was 1.5% by weight in the resulting precursor powder. Moreover, in Comparative Example No. 3, the resulting precursor powder was dispersed in water to prepare a suspension in the preparation of suspension. In addition, a titania sol having an average particle diameter of 30 nm was employed as a metallic oxide source instead of the organosilica sol in the preparation of slurry. Note that the titania sol included titania in an amount of 30% by weight, and the balance of water. Unless otherwise specified, a catalyst of Comparative Example No. 3 for purifying an exhaust gas was produced and examined for the characteristics in the same manner as the First Preferred Embodiment. Tables 2 through 8 below summarize the arrangement of the resulting catalyst, and the characteristics thereof.

TABLE 2

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 1st Pref. Embodiment | Cs and Al | Organosilica sol | 2-propanol | 1.1 | 85 | 61 | 0.6 |
| 2nd Pref. Embodiment | Ba and Al | " | " | 1.0–2.3 | 67–88 | 49–64 | 0.5–0.9 |
| 3rd Pref. Embodiment | Cs, Ba and Al | " | " | | | | |
| 4th Pref. Embodiment | K, Ti and Al | " | " | | | | |
| 5th Pref. Embodiment | K, Cs and Al | " | " | | | | |
| 6th Pref. Embodiment | Pt, Cs and Al | " | " | 1.3 | 92 | 73 | 0.3 |
| 7th Pref. Embodiment | Pt, K, Ti and Al | " | " | 1.2–1.3 | 89–92 | 76–79 | 0.1–0.3 |
| 8th Pref. Embodiment | Pt, Ba, Ti and Al | " | " | 1.2–1.3 | 89–92 | 76–79 | 0.1–0.3 |
| Comp. Ex. No. 1 | Cs and Al | Aluminum nitrate | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, K, Ti and Al | Zirconia sol | Water | 8.2 | 31 | 27 | 3.5 |

TABLE 3

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 9th Pref. Embodiment | Cs and Al | Organoalumina sol | 2-propanol | 2.2–4.3 | 62–89 | 45–71 | 0.2–1.1 |
| 10th Pref. Embodiment | Ba and Al | " | " | " | " | " | " |
| 11th Pref. Embodiment | Cs, Ba and Al | " | " | " | " | " | " |
| 12th Pref. Embodiment | K, Ti and Al | " | " | " | " | " | " |
| 13th Pref. Embodiment | K, Cs and Al | " | " | " | " | " | " |
| 14th Pref. Embodiment | Pt, Cs and Al | " | " | " | " | " | " |
| 15th Pref. Embodiment | Pt, K, Ti and Al | " | " | " | " | " | " |

TABLE 3-continued

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 16th Pref. Embodiment | Pt, Ba, Ti and Al | " | " | " | " | " | " |
| Comp. Ex. No. 1 | Cs and Al | Aluminum nitrate | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, K, Ti and Al | Zirconia sol | Water | 8.2 | 31 | 27 | 3.5 |

TABLE 4

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 17th Pref. Embodiment | Cs and Al | Organozirconia sol | 2-propanol | 4.6–6.7 | 60–81 | 42–68 | 0.4–1.5 |
| 18th Pref. Embodiment | Ba and Al | " | " | " | " | " | " |
| 19th Pref. Embodiment | Cs, Ba and Al | " | " | " | " | " | " |
| 20th Pref. Embodiment | K, Ti and Al | " | " | " | " | " | " |
| 21st Pref. Embodiment | K, Cs and Al | " | " | " | " | " | " |
| 22nd Pref. Embodiment | Pt, Cs and Al | " | " | " | " | " | " |
| 23rd Pref. Embodiment | Pt, K, Ti and Al | " | " | " | " | " | " |
| 24th Pref. Embodiment | Pt, Ba, Ti and Al | " | " | " | " | " | " |
| 25th Pref. Embodiment | K, Ti and Al | Aluminum alkoxide | 2-methoxy-ethanol | 5.4 | 76 | 62 | 1.7 |
| 26th Pref. Embodiment | Pt, K, Ti and Al | Tetraethoxy Silane | 2-propanol | 8.8 | 69 | 55 | 2.1 |
| Comp. Ex. No. 1 | Cs and Al | Aluminum nitrate | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, H, Ti and Al | Zirconia sol | Water | 8.2 | 31 | 27 | 3.5 |

TABLE 5

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 27th Pref. Embodiment | Cs and Al | Zirconium alkoxide | 2-propanol | 6.3–9.1 | 57–76 | 40–63 | 1.4–2.5 |
| 28th Pref. Embodiment | Ba and Al | " | " | " | " | " | " |
| 29th Pref. Embodiment | Cs, Ba and Al | " | " | " | " | " | " |
| 30th Pref. Embodiment | K, Ti and Al | " | " | " | " | " | " |
| 31st Pref. Embodiment | K, Cs and Al | " | " | " | " | " | " |
| 32nd Pref. Embodiment | Pt, Cs and Al | " | " | " | " | " | " |
| 33rd Pref. Embodiment | Pt, K, Ti and Al | " | " | " | " | " | " |
| 34th Pref. Embodiment | Pt, Ba, Ti and Al | " | " | " | " | " | " |
| Comp. Ex. No. 1 | Cs and Al | Aluminum nitrate | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, K, Ti and Al | Zirconia sol | Water | 8.2 | 31 | 27 | 3.5 |

TABLE 6

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 35th Pref. Embodiment | Cs and Al | Aluminum nitrate | 2-propanol and water | 45–56 | 41–56 | 36–43 | 1.4–2.5 |
| 36th Pref. Embodiment | Ba and Al | " | " | " | " | " | " |

TABLE 6-continued

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 37th Pref. Embodiment | Cs, Ba and Al | " | " | " | " | " | " |
| 38th Pref. Embodiment | K, Ti and Al | " | " | " | " | " | " |
| 39th Pref. Embodiment | K, Cs and Al | " | " | " | " | " | " |
| 40th Pref. Embodiment | Pt, Cs and Al | " | " | " | " | " | " |
| 41st Pref. Embodiment | Pt, K, Ti and Al | " | " | " | " | " | " |
| 42nd Pref. Embodiment | Pt, Ba, Ti and Al | " | " | " | " | " | " |
| Comp. Ex. No. 1 | Cs and Al | Aluminum | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, K, Ti and Al | Zirconia sol | Water | 8.2 | 31 | 27 | 3.5 |

TABLE 7

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 43rd Pref. Embodiment | Cs and Al | Alumina sol | 2-propanol and water | 61–69 | 38–58 | 31–45 | 1.2–2.9 |
| 44th Pref. Embodiment | Ba and Al | " | " | " | " | " | " |
| 45th Pref. Embodiment | Cs, Ba and Al | " | " | " | " | " | " |
| 46th Pref. Embodiment | K, Ti and Al | " | " | " | " | " | " |
| 47th Pref. Embodiment | K, Cs and Al | " | " | " | " | " | " |
| 48th Pref. Embodiment | Pt, Cs and Al | " | " | " | " | " | " |
| 49th Pref. Embodiment | Pt, K, Ti and Al | " | " | " | " | " | " |
| 50th Pref. Embodiment | Pt, Ba, Ti and Al | " | " | " | " | " | " |
| Comp. Ex. No. 1 | Cs and Al | Aluminum | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, K, Ti and Al | Zirconia sol | Water | 8.2 | 31 | 27 | 3.5 |

TABLE 8

| Identification | Composition of Precursor Powder | Metallic Powder Source | Solvent of Slurry | Coming-off Rate (%) | $NO_x$ Conversion after Heat Treatment (%) | $NO_x$ Conversion after Sulfur Poisoning (%) | Sulfur Deposition after Sulfur Poisoning (% by weight) |
|---|---|---|---|---|---|---|---|
| 51st Pref. Embodiment | Cs and Al | Zirconia sol | 2-propanol and water | 84–88 | 43–52 | 32–43 | 1.4–2.6 |
| 52nd Pref. Embodiment | Ba and Al | " | " | " | " | " | " |
| 53rd Pref. Embodiment | Cs, Ba and Al | " | " | " | " | " | " |
| 54th Pref. Embodiment | K, Ti and Al | " | " | " | " | " | " |
| 55th Pref. Embodiment | K, Cs and Al | " | " | " | " | " | " |
| 56th Pref. Embodiment | Pt, Cs and Al | " | " | " | " | " | " |
| 57th Pref. Embodiment | Pt, K, Ti and Al | " | " | " | " | " | " |
| 58th Pref. Embodiment | Pt, Ba, Ti and Al | " | " | " | " | " | " |
| Comp. Ex. No. 1 | Cs and Al | Aluminum | Water | 3.3 | 35 | 31 | 3.9 |
| Comp. Ex. No. 2 | K, Ti and Al | Alumina sol | Water | 5.2 | 30 | 24 | 4.3 |
| Comp. Ex. No. 3 | Pt, K, Ti and Al | Zirconia sol | Water | 8.2 | 31 | 27 | 3.5 |

Evaluation

According to Tables 2 through 8, the catalysts of Comparative Example Nos. 1 through 3 exhibited a lower $NO_x$ conversion after heat treatment than those of the First through Fifty-eighth Preferred Embodiments did. Moreover, the sulfur deposited in the catalysts of Comparative Example Nos. 1 through 3 in a larger amount than it did in those of the First through Fifty-eighth Preferred Embodiments. Thus, it is appreciated from Tables 2 through 8 that the catalysts of Comparative Examples Nos. 1 through 3 were sharply deteriorated in terms of the $NO_x$ conversion after heat treatment, and that they were inferior to those of the First through Fifty-eighth Preferred Embodiments in terms of the sulfur-poisoning resistance.

On the other hand, the catalysts of the First through Fifty-eighth Preferred Embodiments were good in terms of the heat resistance and sulfur-poisoning resistance. Accordingly, they verify indirectly that the dispersibility of the $NO_x$ storage elements was kept highly therein. Among them, the catalysts of the First through Eighth Preferred Embodiments whose metallic oxide source was the organosilica sol exhibited an especially small coming-off rate, and were apparently good in terms of the coating-layer strength.

Note that, as recited in Tables 6 through 8, the catalysts of the Thirty-fifth through Fifty-eighth Preferred Embodiments exhibited a larger coming-off rate and a lower $NO_x$ conversion after heat treatment than those of the First through Thirty-fourth Preferred Embodiments did. This drawback results from the fact that water is involved in the slurry for preparing the coating layer. Thus, it is understood that the slurry can preferably be free from water completely. However, depending on service conditions, the catalysts of the Thirty-fifth through Fifty-eighth Preferred Embodiments can be used properly in practice, because they were better than those of Comparative Example Nos. 1 through 3 in terms of the characteristics.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a catalyst for purifying an exhaust gas, comprising the steps of:

preparing a suspension by dispersing a precursor powder in a solvent, the precursor powder including amorphous and homogeneous composite particles, and a catalytic noble metal element, the composite particles including a support component, and an NOx storage component, the support component including an oxide of metal being at least one element selected from the group consisting of group 3B elements, group 4A elements and group 4B elements in the periodic table of the elements, the NOx storage component including at least one element selected from the group consisting of alkali metals, alkaline-earth metals and rare-earth elements, the catalytic noble metal element being only in a state in which the catalytic noble metal element is involved homogeneously in the composite particles, the solvent being free from elution of the NOx storage component, preparing a slurry by mixing an organosol with the suspension, the organosol including an organic solvent, and an oxide sol including at least one oxide selected from the group consisting of oxides of aluminum (Al), oxides of silicon (Si) and oxides of zirconium (Zr), and dispersed in the organic solvent; and depositing the slurry on a support substrate, and drying and thermally treating the support substrate, thereby forming a coating layer on the support substrate.

2. The process according to claim 1 further comprising a step of preparing the composite particles, wherein said step includes:

preparing a first solution with a sol which includes an oxide constituting the support component;

mixing the first solution with a second solution of a compound which includes said $NO_x$ storage component;

turning the mixed solution into a gel; and thermally treating the resulting gel.

3. The process according to claim 1 further comprising a step of preparing the composite particles, wherein said step is carried out by a sol-gel process by supplying both of the support component and the $NO_x$ storage component as their metallic alkoxides.

4. The process according to claim 1, wherein, in said step of preparing a slurry, a concentration of the precursor powder falls in a range of from 30 to 70% in the slurry.

5. The process according to claim 1, wherein, in said step of preparing a slurry, the organosol is added to the suspension in such an amount that the element constituting the organosol occupies in a range of from 0.1 to 20% by weight in the resulting coating layer formed on the support substrate, the range expressed by an amount of oxide of the element therein.

6. The process according to claim 1, wherein said step of preparing a slurry includes a step of selecting at least one organosol from the group consisting of an organoalumina sol, an organosilica sol an organozirconia sol.

7. The process according to claim 1, wherein said step of preparing a slurry includes a step of selecting the organosol having an average particle diameter of 100 nm or less.

8. A process for producing a catalyst for purifying an exhaust gas, comprising the steps of:

preparing a suspension by dispersing a precursor powder in a solvent, the precursor powder including amorphous and homogeneous composite particles, the composite particles including a support component, an NOx storage component and a catalytic noble metal element, the support component including an oxide of metal being at least one element selected from the group consisting of group 3B elements, group 4A elements and group 4B elements in the periodic table of the elements, the NOx storage component including at least one element selected from the group consisting of alkali metals and alkaline-earth metals, the catalytic noble metal element being only in a state in which the catalytic noble metal element is involved homogeneously in the composite particles, the solvent being free from elution of the NOx storage component, preparing a slurry by mixing an organosol with the suspension, the organosol including an organic solvent, and an oxide sol including at least one oxide selected from the group consisting of oxides of aluminum (Al), oxides of silicon (Si) and oxides of zirconium (Zr), and dispersed in the organic solvent; and depositing the slurry on a support substrate, and drying and thermally treating the support substrate, thereby forming a coating layer on the support substrate.

9. The process according to claim 8, wherein the NOx storage component is an alkali metal.

10. The process according to claim 8, wherein the NOx storage component is an alkaline-earth metal.

11. The process according to claim 8, wherein the NOx storage component includes an alkali metal and an alkaline-earth metal.

12. The process according to claim 8, wherein the NOx storage component is free of rare earth metals.

* * * * *